United States Patent [19]

Singleton et al.

[11] 4,140,991

[45] Feb. 20, 1979

[54] UNDERWATER DISPLACEMENT PROBE

[75] Inventors: Robert J. Singleton, Rockville; John F. Stasiewicz, Jr., Gaithersburg, both of Md.

[73] Assignee: The United States of America as represented by the Secretary of the Navy, Washington, D.C.

[21] Appl. No.: 824,931

[22] Filed: Aug. 15, 1977

[51] Int. Cl.$^2$ ............................................. H04B 13/02
[52] U.S. Cl. ..................................................... 340/4 E
[58] Field of Search .................... 340/4 E; 324/3, 6, 7, 324/207

[56] References Cited
U.S. PATENT DOCUMENTS 3,497,869  2/1970  Silverman ............................. 340/4 E

FOREIGN PATENT DOCUMENTS 510471  3/1955  Canada ..................................... 340/4 E
578844  7/1946  United Kingdom ..................... 340/4 E Primary Examiner—Richard A. Farley
Attorney, Agent, or Firm—R. S. Sciascia; Q. E. Hodges

[57] ABSTRACT

This device is used in an underwater environment to determine the exact location of an object or the displacement of an object from an equilibrium position within a relatively small confined area. An alternating electric current is transmitted through the water, thereby creating an electric field surrounding the object. A probe placed on the object and connected to a voltage amplifier measures the electric potential of the probe and the object with respect to the potential of one of the electrodes. The position or the displacement of the object is then determined from its measured electric potential.

13 Claims, 3 Drawing Figures

UNDERWATER DISPLACEMENT PROBE

The invention described herein may be manufactured and used by or for the Government of the United States of America for governmental purposes without the payment of any royalties thereon or therefor.

BACKGROUND OF THE INVENTION

It is often desirable to test scale models of ship hulls, propellers, torpedeos, tow cables, etc., in water tanks to determine their operating characteristics before building the full scale devices. Sometimes the scale model being tested will be towed through a tank of stationary water and sometimes the scale model is held stationary while the water is circulated past it. While doing such testing, it is often necessary to measure movements and vibrations of the model being tested as the water flows past it. Photographic techniques have been used to measure such movements and vibrations in the past. However, the photographic techniques require that a submerged photo pit or a water proof protective housing be available in which to mount the camera equipment. Furthermore, accurate measurements of the magnitude of the vibrations require that one make complicated corrections for the optical distortion at the air-water interfaces. It is difficult to automate the process of reducing the data which is collected on photographic film. Another technique which has been used is to place accelerometers on the scale model being tested. Since the output of the accelerometer represents the acceleration of the test model, this output must be integrated once to obtain the velocity of the test model and integrated twice to obtain the relative position of the test model. This single and double integration presents the possibility of large cumulative errors in measuring velocity or position on long test runs. Other methods such as variable inductance transducers and differential transformers have the required resolution and sensitivity, but as a result of the size of the required coils, tend to interfer with the flow of water. A technique for measuring changes in position and vibrations of test models in water should be accurate, lend itself to automated data reduction, be easy to use, and not interfer with the flow of water around the model.

OBJECTS OF THE INVENTION

It is therefore an object of this invention to provide a convenient and easy means for measuring movements in water of a test model.

It is another object of this invention to provide a means for measuring movements of a test model in water which has a high degree of resolution, sensitivity, and accuracy.

It is another object of this invention to provide a means for measuring movements of a test model in water wherein the measuring means does not restrict or interfer with the flow of water around the test model.

Yet another object of this invention is to provide a means for measuring movements of a test model in water wherein the data collected by these means is in a form that readily lends itself to processing by automated data processing equipment.

SUMMARY OF THE INVENTION

This invention measures the movements of an object in water by setting up an electric field in the water surrounding that object and measuring the electric potential of the object in that electric field. The electric field is created by connecting a current source to two electrodes which are located in the water near the object. Current flows between the two electrodes through the water surrounding the object. If necessary, a chemical may be added to the water to provide a sufficient number of ions for adequate current flow through the water. A metallic probe is placed on the object and the difference in electric potential between this probe and one of the electrodes is measured and displayed. When the probe moves parallel to the surfaces of equal electric potential between the electrodes, no change in electric potential will be measured. When the probe moves perpendicular to the surfaces of equal electric potential, the maximum possible change in electric potential for a given amount of movement will be measured. Movements of the object can be measured in two dimensions by using two sets of electrodes with each set of electrodes driven by an alternating voltage at a different frequency. The alternating signal detected by the probe can then be separated into its two frequency components with the magnitude of each frequency component separately analyzed to determine the amount of probe movement along two different axises.

DESCRIPTION OF THE PREFERRED EMBODIMENT

Figure 1:
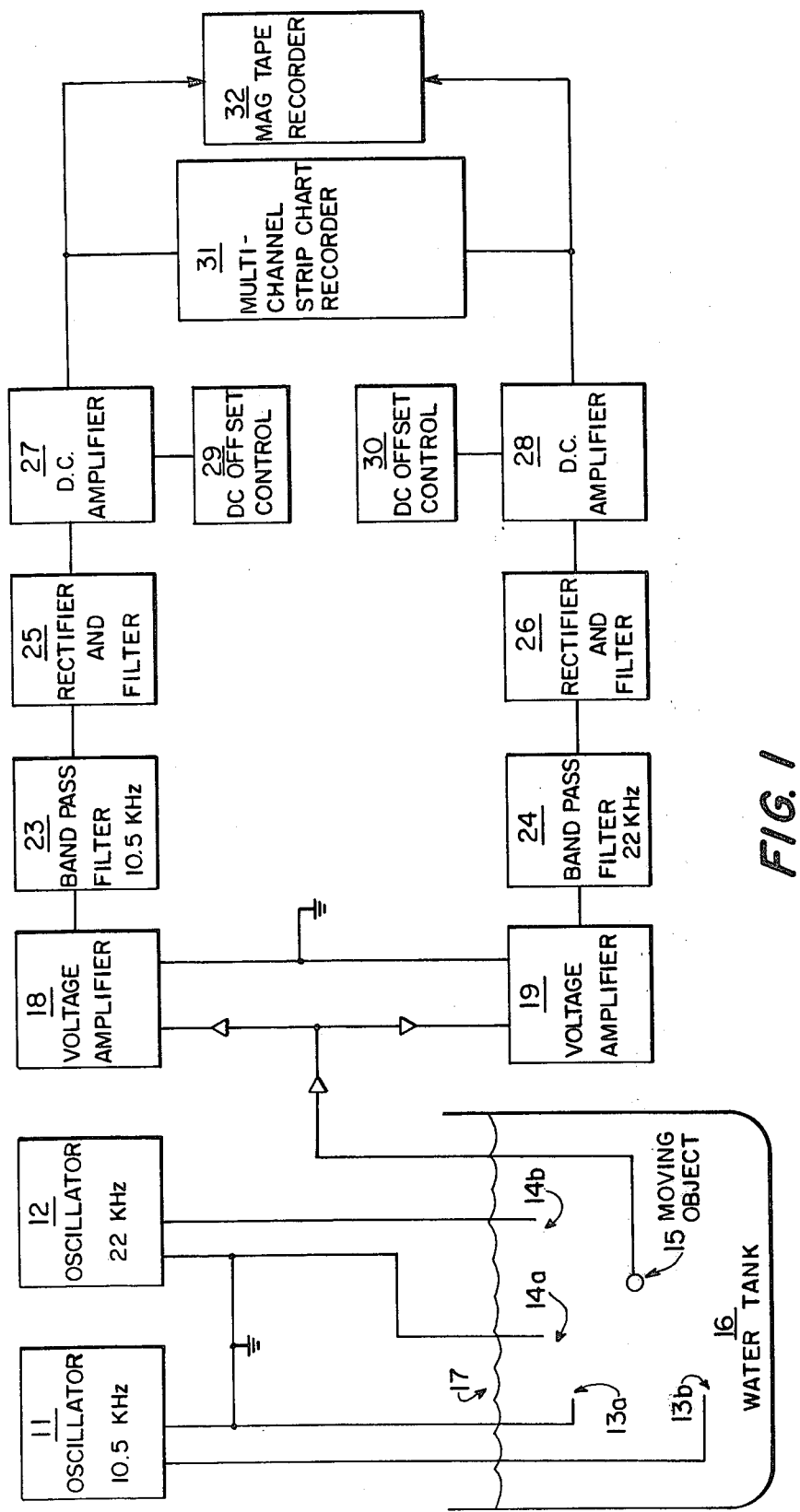
FIG. 1 shows a block diagram of the circuit of the preferred embodiment of this invention.

The block diagram of FIG. 1 shows an example of an embodiment of the invention as a system which will measure movements of the object in water in two dimensions. In the example a first oscillator 11 delivers an alternating voltage at 10.5 khz to the first set of electrodes 13a and 13b. The second oscillator 12 delivers an alternating voltage at 22 khz to the second set of electrodes 14a and 14b. Electrodes 13a and 14a are connected to the common ground. The two sets of electrodes 13a and b and 14a and b are positioned below the surface of the water 17 in the water tank 16 near the object 15 whose position and movements are to be measured. Attached to the moving object 15 is a probe which detects the electric potential of the moving object in the electric fields created by the electrodes 13a, 13b, 14a and 14b. The voltage detected by the probe is fed to one input of each of the amplifiers 18 and 19. The other inputs to the amplifiers 18 and 19 are attached to the same common ground as are electrodes 13a and 14a. The input impedance of the amplifiers 18 and 19 is much higher than the impedance of the current paths between the probe 15 and any of the electrodes. If this were not true, current flow through the probe would greatly distort the shape of the electric field created by the electrodes. A band pass filter 23 is tuned to 10.5 khz so that the output of amplifier 18 is filtered to exclude all signals except for those which were generated by oscillator 11 and radiated by electrodes 13a and 13b. The band pass filter 24 is tuned to 22 khz so as to filter out all signals from the output amplifier 19 except for those signals which were generated by oscillator 12 and radiated by electrodes 14a and 14b. The output of the filter 23 is passed through a rectifier and low pass filter 25 to detect the amplitude of the 10.5 khz signal. The output of the filter 24 is passed through another rectifier and low pass filter 26. The output of the rectifiers and low pass filters are passed through DC amplifiers 27 and 28 and recorded by the strip chart recorders 31 and the magnetic tape recorder 32. When the object is not moving, the output of the rectifiers and filters 25 and 26 will be DC voltages. These DC voltages can be nulled out by the DC offset controls 29 and 30. The magnetic tape recordings produced by the tape recorder 32 may be analyzed using automated data processing equipment.

Figure 2:
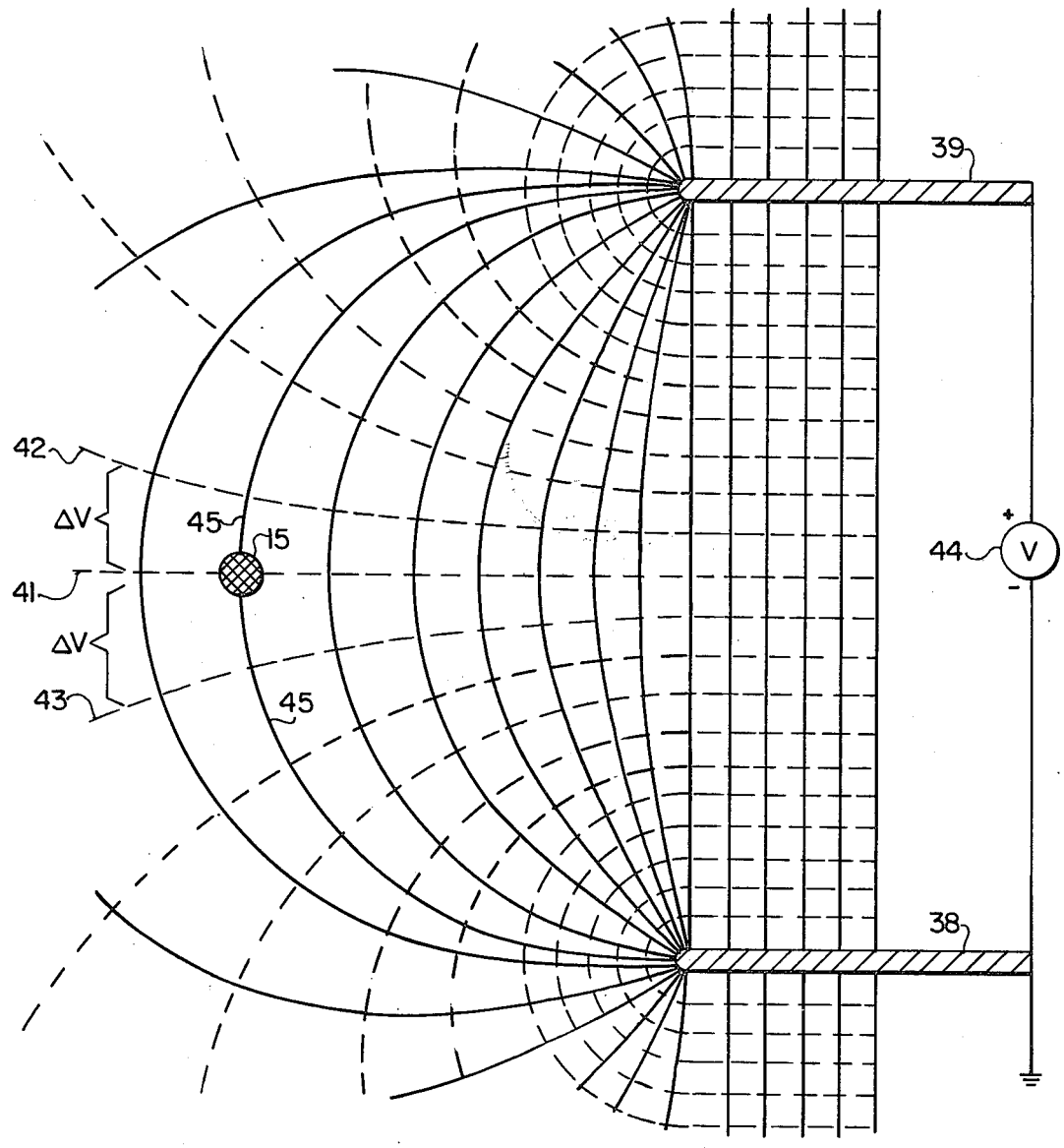
FIG. 2 is a graphic illustration of the electric field between two electrodes and surrounding the probe.

FIG. 2 shows two electrodes 38 and 39 in water near the probe 15. Connected across the two electrodes 38 and 39 is a voltage source 44 which applies a voltage between the two electrodes. The electrode 38 is connected to ground. The solid lines drawn between the two electrodes indicate the direction of current flow through the water and the direction of the electric field in any particular point. The magnitude of the electric field and the density of the current flow at any particular point is directly proportional to the density of the solid lines. The dashed lines surrounding the two electrodes 38 and 39 represent lines of equal electric potential. The difference in potential between one of the electrodes and one of the dashed lines will be the same for all points on that dashed line. If the probe 15 were moved along one of the dashed lines, such as line 41, no change in the potential of the probe with respect to either of the electrodes would be detected. The lines of equal electric potential and the lines of the electric fields will always be perpendicular to each other wherever they cross. If the probe 15 is moved over along one of the lines of the electric field, such as line 45, the potential of the probe 15 with respect to either of the electrodes will change at the maximum possible rate. As shown in FIG. 2, the potential of the probe 15 will be changed by an amount $\Delta V$ by moving it from line 41 to either line 42 or 43. This change in potential will be the same regardless of the path that the probe takes between the two lines. The signals produced by the probe may be calibrated by measuring the magnitude of the probe movement using prior art techniques, such as photographic techniques, and comparing this amount of movement with the magnitude of the signals from the probe.

Figure 3:
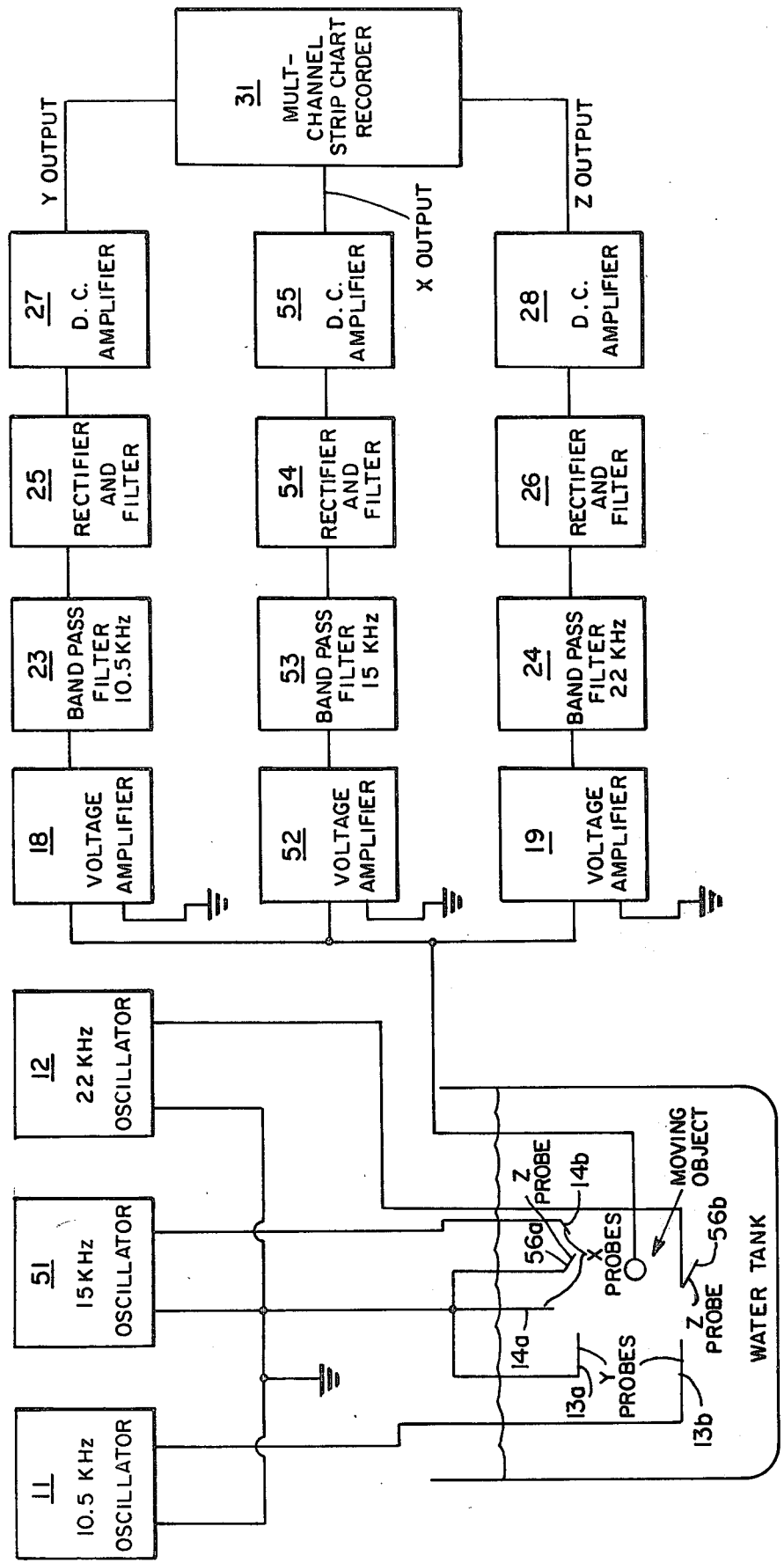
FIG. 3 shows a block diagram of a circuit for measuring positions in three dimensions.

FIG. 2 shows a two dimensional cross section of what is in reality is a three dimensional field pattern. The two dimensional lines shown in FIG. 2 to depict electric potential and the electric field will be three dimensional surfaces around a set of actual electrodes. The electric fields generated by two different sets of electrodes depicted in FIG. 2 may be used to measure the movement of the probe 15 along one axis only. This axis will be in the direction of the lines of the electric field immediately surrounding the probe. The amount of movement of the probe 15 along a second axis may be measured by measuring the potential of the probe 15 with respect to a second set of electrodes which are positioned so as to create an electric field whose lines of electric force in the vicinity of the probe are parallel to this second axis. In the same way, the movements of the probe along a third axis can be measured by measuring the probe's electric potential with respect to a third set of electrodes. In this invention, the superimposed signals which the probe detects from the multiple superimposed electric fields are separated from each other by having the different electric fields oscillate at different frequencys. This produces signals in the probe of different frequencys which may be separated with filters. The system depicted in FIG. 1 is a two dimensional system. A three dimensional measurement system could be easily obtained, as shown in FIG. 3, by adding an additional oscillator 51, set of electrodes 56a and 56b, voltage amplifier 52, band pass filter 53, rectifier and low pass filter 54, and DC amplifier 55 to those which are already shown in FIG. 1. When a system is set up to measure movements in two or three dimensions, these dimensions may be made perpendicular to each other by positioning the three sets of electrodes with respect to each other and with respect to the probe so that the surfaces of equal electric potential with respect to one set of electrodes will, in the immediate vicinity of the probe, be perpendicular to the equal potential surfaces with respect to the other electrodes.

The frequency of the oscillators 11 and 12 in FIG. 1 must be a few thousand khz so as to prevent polarization of water molecules and electrolysis of the water into hydrogen and oxygen. The oscillators 11 and 12 and the electrodes 13a, 13b, 14a and 14b shown in FIG. 1 may be thought of as an electric field generator means. All of the amplifiers, filters, rectifiers, and strip chart recorder attached to the probe in FIG. 1 may be thought of as a signal analyzing means. The strip chart recorder 31 and magnetic tape recorder together with the DC amplifiers 27 and 28, DC offset controls 29 and 30 and the rectifiers and low pass filters 25 and 26 are one example of what may be regarded as a voltage amplitude recording means. Anyone skilled in the art would be able to substitute other standard circuits which record the amplitude of the voltages at the outputs of the band pass filters. The system depicted in FIG. 1 illustrates the use of frequency division multiplexing to separate the signals which the probe 15 receives from the two different sets of electrodes. Other techniques of separating these signals such as time division multiplexing could also be used. In the system illustrated in FIG. 1, the two sets of electrodes are placed relatively close to each other and to the moving object since the object is moving a relatively small distance. The purpose of the system shown in FIG. 1 is to measure the position and movements of the object about a relatively small area. However, this invention can also be useful in situations where the different sets of electrodes are widely separated. In this situation the frequency and the amplitude or other characteristics of the signals detected by the probe could indicate which set of electrodes the probe is close to and how close the probe is to that set of electrodes. To record the large scale movements of the objects, one could install several sets of electrodes being driven by oscillators at different frequencys and feed the signals detected by the probe to an equal number of voltage analyzer channels. Each voltage analyzer channel would include an amplifier, a band pass filter tuned to a different frequency and a voltage amplitude recording means.

Obviously many modifications and variations of this invention are possible in light of the above teachings. It is therefore to be understood that within the scope of the appended claims the invention may be practiced otherwise than as specifically described.

What is claimed is:

1. A system for measuring the underwater movement of an object comprising:
   two oscillators which are set to deliver signals at different frequencies;
   a conductive probe attached to the object whose position is being measured;

a separate set of two electrodes connected to each of the oscillators, with the electrodes being positioned underwater near the object, and with one of the electrodes in each set connected to a common ground, with the two sets of electrodes positioned with respect to each other and with respect to said probe so that the surfaces defined by the points having equal electric potential relative to one of the two sets of electrodes, will be perpendicular, in the space immediately surrounding the probe, to the surfaces defined by all points having equal electric potential relative to the other of the two sets of electrodes;

two voltage amplifiers with each amplifier having an output and having an input which is connected between the probe and the common ground;

two band-pass filters with each of the filters having an input and output, being tuned to the frequency of a different one of said oscillators and with the filter input connected to an output of a different one of said voltage amplifiers; and a voltage amplitude recording means attached to outputs of each of said filters.

2. The system of claim 1 wherein:

the number of probes is limited to one; and the two sets of electrodes are mounted along two approximately perpendicular axes.

3. A system for locating an object underwater comprising:

a plurality of first means for establishing a plurality of electric fields in the vicinity of the object, said fields being orthogonal and overlapping relative to each other, and each of said fields being of a different frequency;

second means connected to said object for determining the amplitude of the electric potentials, relative to the first means, of the orthogonal electric fields at the position of the object, said second means having a single probe; and third means connected to said second means for displaying said amplitudes of the electric potentials.

4. The system of claim 3 wherein:

each of said first means includes an oscillator and a pair of electrodes with each of the oscillators being tuned to a different frequency;

said second means further comprises a plurality of bandpass filters with each of the filters tuned to the frequency of a different one of said oscillators.

5. The system of claim 3 wherein the number of first means is two and the number of orthogonal electric fields is two.

6. The system of claim 3 wherein the number of first means is three and the number of orthogonal electric fields is three.

7. The system of claim 4 wherein the number of first means is two and the number of orthogonal electric fields is two.

8. The system of claim 4 wherein the number of first means is three and the number of orthogonal electric fields is three.

9. A method for measuring the position of an object underwater comprising:

generating a plurality of alternating electric fields which are orthogonal and overlapping in the space where the object is located, with each of the fields alternating at a different frequency;

detecting the electric potential at a single point at said object in said orthogonal electric fields, producing an electric signal proportional to the electric potential;

filtering said electric signal to separate the signal into components having the same frequencies as said electric fields; and measuring the amplitudes of the filtered components of said electric signal.

10. The method of claim 9 wherein the number of orthogonal electric fields is two.

11. The method of claim 9 wherein the number of orthogonal electric fields is three.

12. A method for measuring the position of an object underwater comprising:

generating a plurality of orthogonal overlapping alternating electric fields oscillating at different frequencies about an object;

detecting the electric potential at a point associated with the object in said electric fields which encompass the point;

producing an electric signal proportional to the electric potential of the respective fields frequencies at the point; and separating the signal into its frequency components corresponding to the frequencies fields;

measuring the relative potential of each frequency to determine the location of the object in the fields.

13. The method of claim 12 in which the successive positions of the object are determined to thereby measure the vibratory displacement of the object.

* * * * *